US Patent Office 3,332,408
Patented July 25, 1967

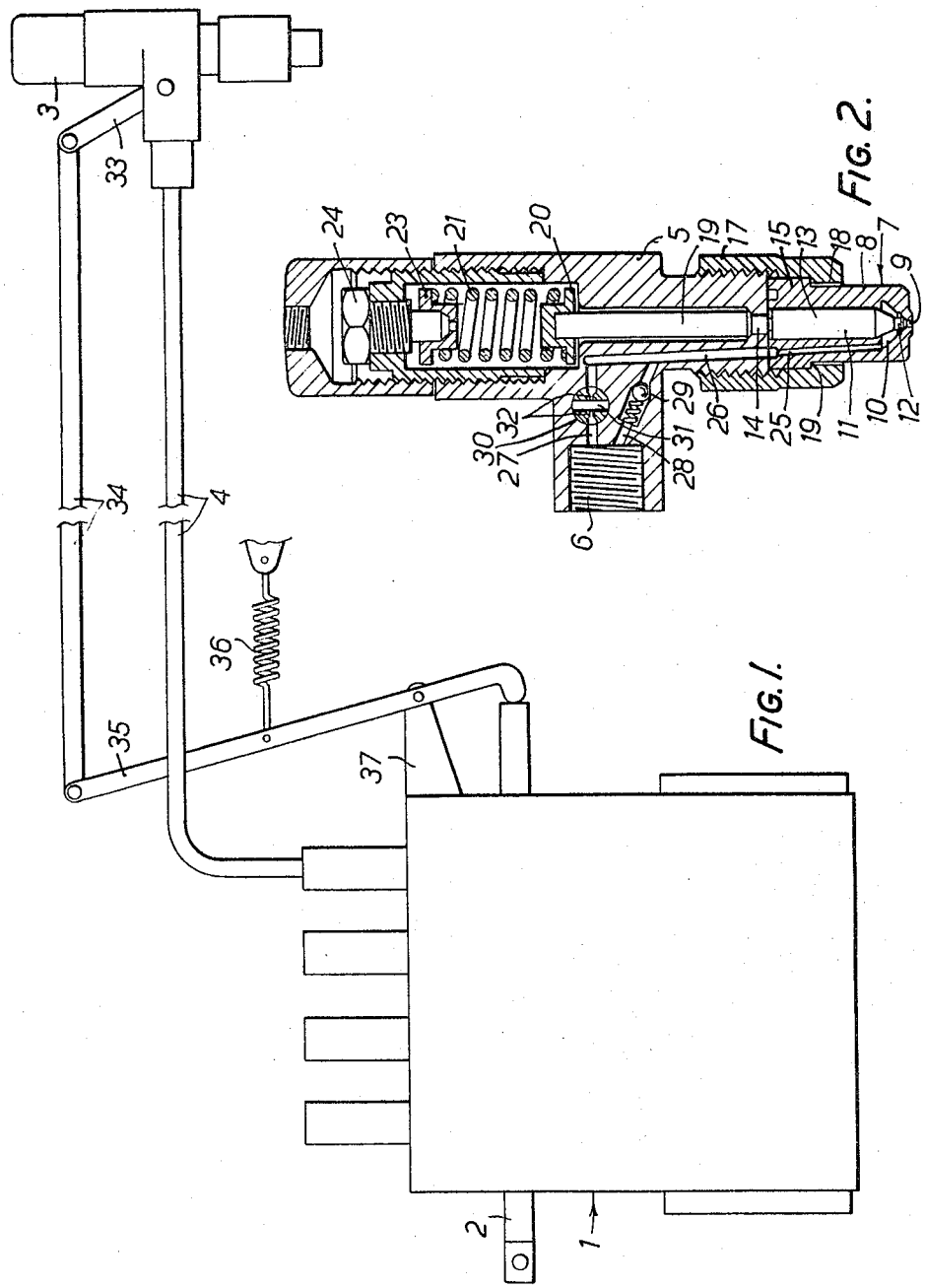

3,332,408
FUEL INJECTION APPARATUS FOR INTERNAL COMBUSTION ENGINES
William Murray Scott, Brighton, Brian Wyatt Millington, Worthing, and Royston Gordon Freese, Shoreham-by-Sea, England, assignors to Ricardo & Co., Engineers (1927) Limited, London, England, a company of Great Britain
Filed Oct. 22, 1965, Ser. No. 501,715
Claims priority, application Great Britain, Oct. 26, 1964, 43,576/64
2 Claims. (Cl. 123—140)

This invention relates to fuel injection apparatus for internal combustion engines of the liquid fuel injection compression ignition type and of the kind comprising fuel delivery means, usually in the form of, and hereinafter for convenience assumed to be a reciprocating fuel pump, arranged to deliver fuel in predetermined quantities at appropriately timed intervals to at least one fuel injection device of the type which includes a nozzle, and a valve (herein called the injection valve) controlling the flow of fuel through the nozzle and so arranged as to be opened automatically during each injection period by the fuel pressure in a pressure chamber in the injection device, usually adjacent to the injection orifice or orifices, to which chamber the pump delivers the fuel.

One of the disadvantages of reciprocating internal combustion engines of the liquid fuel injection compression ignition type (and particularly those of relatively small capacity as are used in road vehicles) as compared with engines of the vapourised charge spark ignition type is that they tend to be noisy, particularly when idling and at low speeds.

Research into the cause of the noisy operation has shown that a substantial proportion of the noise, including the well known "diesel knock" appears to result from the high rate of injection inherent in existing injection systems, augmented in some cases by the fact that at the delivery pressures employed there is appreciable volumetric elasticity in the part of the system between the pump and the injection device which tends to delay the injection while pressure builds up in this part of the system until the injection valve opens, whereupon injection begins at a high volumetric rate. Moreover in existing systems there is a substantial delay between the beginning of injection and the initiation of burning, and the result, which is attributed to one or both of these causes, is that when burning begins, there is a rapid initial pressure rise in the engine cylinder and consequent noisy operation. It has been found that if the rate of the initial pressure rise can be reduced, as by reducing the initial rate of injection and/or the delay between the beginning of injection and the beginning of burning, the noise is similarly reduced, and various proposals have, therefore, been made which aim at reducing the rapidity of the initial pressure rise. One such proposal is the injection into the air charge prior to the main injection (e.g. during the induction or compression period) of a small quantity of fuel which is insufficient in itself to cause an appreciable pressure rise but which ignites before the main injection begins so that the burning of the fuel then injected tends to start with little delay. This proposal, which is usually called "pilot injection," has not however been entirely successful in its purpose. It has been found for example that at the injection pressures required in practice it is difficult to provide for such a pilot injection in advance of the main injection whether there is a time interval between the pilot injection and the main injection or not, due to the volumetric elasticity referred to, which causes the fuel line between the pump and the pressure chamber of the injector to act to some extent as a hydraulic accumulator so that when the injection valve opens the initial rate of injection is too high for quiet engine operation.

The present invention has for its object to provide a form of fuel injection apparatus of the general kind referred to which will represent a still further improvement over existing systems.

Fuel injection apparatus for an internal combustion engine of the liquid fuel injection compression ignition type according to the present invention comprises fuel delivery means arranged to deliver fuel in measured quantities to at least one fuel injection device of the type which includes a nozzle and a valve controlling the flow of fuel through the nozzle and arranged to be opened during each injection period by the fuel pressure in a pressure chamber in the injection device, to which chamber the fuel pump delivers the fuel, wherein there is interposed between the fuel delivery means and the pressure chamber change-over valve apparatus having a "normal power" position in which it permits substantially free flow of fuel from the fuel delivery means to the pressure chamber and a "restricted power" position in which the fuel delivered by the fuel delivery means is caused to traverse a restricted passage on its way to the pressure chamber, while control means arranged to be operated automatically by the pump control mechanism by which the quantity of fuel delivered during each injection period is controlled, are provided whereby for settings of the pump control mechanism corresponding to any substantial power output from the engine the fuel is permitted to flow substantially freely to the pressure chamber, whereas for settings of the pump control mechanism corresponding to low engine power output the fuel is delivered to the pressure chamber at least mainly through the restricted passage.

One arrangement according to the invention is shown somewhat diagrammatically by way of example in the accompanying drawings, in which:

FIGURE 1 is a partly diagrammatic view showing the fuel injection apparatus, and FIGURE 2 is a cross-section of an enlarged scale through the fuel injection device shown in FIGURE 1.

In the form of apparatus shown a fuel pump, indicated diagrammatically at 1, is controlled by a control member 2 transverse movement of which controls directly in known manner the amount of fuel delivered on each delivery stroke. The control member 2 is connected in conventional manner, not shown, to a manual or foot control. Fuel from the fuel pump is delivered to a fuel injection device 3 via a passage 4.

The fuel injection device 3 is shown in detail in FIGURE 2 and comprises a body part 5 in which is formed a passage 6 constituting a continuation of the main delivery passage 4 and by which fuel is delivered through further passages hereinafter described to a nozzle assembly indicated generally at 7. The nozzle assembly comprises a nozzle member 8 having formed therein a main injection orifice 9 opening out of a pressure chamber 10 in which lies the lower end of a valve member 11 having a valve part 3 which, when the valve member 11 is in its closed position, engages a seating so as to close the orifice 9. The stem part 13 of the valve member 11 slides with a close sliding fit within a bore within the nozzle member 8 and is provided with a projection 14.

The upper part 15 of the nozzle member 8 is clamped to the main body part 5 of the injection device by a screwthreaded clamping member 17 the lower end of which has an inwardly directed flange 18 engaging a shoulder 19 on the part 16.

The main body part 5 has a central bore into which projects the projection 14 on the valve member 11 and in which lies and can slide a push rod 19 the upper end of which carries a thrust collar 20 on which acts the lower end of a compression spring 21 the upper end of which bears against a thrust member 23 which in turn is acted upon by an adjustable screw 24. Thus the valve member 11 is continuously urged downwards by the spring 21 but can be moved upwardly against the action of this spring, so that the valve part 12 leaves its seating, if and when fuel at sufficient pressure is delivered to the pressure chamber 10.

Fuel is delivered to the pressure chamber 10 via a passage 25 in the nozzle member 8, a passage 26 in the main body part 5 and a passage 27 communicating with the inlet passage 6. A relief passage 28 controlled by a spring-pressed non-return valve 29 extends in parallel with the passage 27. The passage 27 is controlled by a change-over valve 30 capable of being rocked about its axis through 90°. The valve 30 has formed therein a main passage 31 which, when the valve occupies a position displaced by 90° from the position shown in FIGURE 2, permits free flow of fuel from the pump delivery passage 6 to the passage 26, whereas when the valve occupies the position shown in FIGURE 2 communication between the pump delivery passage 6 and the passage 26 is effected solely through a pair of ports indicated at 32, which communicate with one another across the passage 31, and constituted a restricted passage, the passage 31 in this position of the valve 30 being closed at its ends.

The valve 30 is connected to the control member 2 of the fuel pump by means of a link 33 rigidly connected at its lower end to the valve 30 and pivoted at its upper end to one end of a link 34 the other end of which is pivoted to a link 35 which is pivoted adjacent its lower end to a bracket 36 on the fuel pump, the link 35 being biassed towards the right by means of a spring 36 so that when the control member 2 on the fuel pump is in the idling position the valve 30 will be in the position shown in FIGURE 2. Thus, it will be seen that as the control member 2 is moved to the right to increase the amount of fuel delivered by the fuel pump for each stroke, the member 35 will be moved to the left and the valve 30 will be rotated in an anti-clockwise direction so that for full power the main passage 31 will be fully open.

The purpose of the non-return valve 29 in the passage 28 is to provide in known manner for pressure relief in the chamber 10 at the end of the closing movement of the injection valve.

It will be understood that the dimensions of the various passages is such that on the movement of the valve 30 from the position shown in FIGURE 2 to the position in which the passage 31 is fully opened the passage 31 will begin to open before the ports 32 are closed.

What we claim as our invention and desire to secure by Letters Patent is:

1. Fuel injection apparatus for an internal combustion engine of the liquid fuel injection compression ignition type comprising a fuel injection device including a nozzle provided with at least one injection orifice, a pressure chamber, and a valve controlling the flow of fuel through the nozzle and arranged to be opened automatically during each injection period by the fuel pressure in said pressure chamber, fuel delivery means arranged to deliver fuel in measured quantities and at appropriately timed intervals, passage means for the flow of fuel from said fuel delivery means to said pressure chamber including passages respectively of relatively large and restricted cross-sectional areas, change-over valve apparatus having a normal power position in which it permits flow of fuel through the passage of relatively large cross-sectional area and a restricted power position in which it causes the fuel to flow through the passage of relatively restricted cross-sectional area, and control means whereby the changeover valve apparatus is caused to occupy its normal power position for a range of engine operating conditions representing an upper part of the total range of engine operating conditions and to occupy its restricted power position over a range of engine operating conditions representing a lower part of the total range of engine operating conditions.

2. Fuel injection apparatus as claimed in claim 1 including control means for varying the quantity of fuel delivered by the fuel delivery means during each delivery period, in which the control means for the change-over valve apparatus is actuated automatically by said control means to maintain the change-over valve apparatus in the normal power position over the range of movement of the control member corresponding to the delivery of relatively large quantities of fuel and to move the change-over valve apparatus into its restricted power position when said control means is moved to a position representing delivery of relatively small quantities of fuel.

References Cited

UNITED STATES PATENTS

| | | | |
|---|---|---|---|
| 2,143,168 | 1/1939 | Pedersen | 123—140 |
| 2,190,051 | 2/1940 | Tuscher | 123—140 |

MARK NEWMAN, *Primary Examiner.*

L. M. GOODRIDGE, *Assistant Examiner.*